US012807767B2

(12) United States Patent
Li et al.

(10) Patent No.: US 12,807,767 B2
(45) Date of Patent: Nov. 24, 2026

(54) CYCLODEXTRIN-BASED METAL ORGANIC FRAMEWORK MATERIAL AND PREPARATION METHOD THEREFOR

(71) Applicant: SOUTH CHINA UNIVERSITY OF TECHNOLOGY, Guangzhou (CN)

(72) Inventors: Xiaoxi Li, Guangzhou (CN); Chengdeng Chi, Guangzhou (CN); Ling Chen, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 1175 days.

(21) Appl. No.: 17/605,249

(22) PCT Filed: Oct. 25, 2019

(86) PCT No.: PCT/CN2019/113455
§ 371 (c)(1),
(2) Date: May 15, 2022

(87) PCT Pub. No.: WO2020/215638
PCT Pub. Date: Oct. 29, 2020

(65) Prior Publication Data

US 2022/0282046 A1 Sep. 8, 2022

(30) Foreign Application Priority Data

Apr. 22, 2019 (CN) ......................... 201910325089.1

(51) Int. Cl.
*C08G 83/00* (2006.01)
*C08B 37/16* (2006.01)

(52) U.S. Cl.
CPC ........ *C08G 83/008* (2013.01); *C08B 37/0012* (2013.01)

(58) Field of Classification Search
CPC ................ C08G 83/008; C08G 83/001; C08B 37/0012; C08B 37/0015
See application file for complete search history.

(56) References Cited

U.S. PATENT DOCUMENTS 9,611,218 B2 * 4/2017 Van Der Boom ..... C08G 83/00
2017/0028383 A1 2/2017 Limketkai

FOREIGN PATENT DOCUMENTS

CN 105814118 7/2016
CN 107151329 9/2017
(Continued)

OTHER PUBLICATIONS

Liu et al. (Cryst. Growth Des. 2017, 17, 1654-1660 supporting information) (Year: 2017).*
(Continued)

*Primary Examiner* — Scarlett Y Goon
*Assistant Examiner* — Sarah Grace Hibshman
(74) *Attorney, Agent, or Firm* — JMB Davis Ben-David

(57) ABSTRACT

The present disclosure belongs to the field of chemical industry production, and particularly relates to CD-MOFs and a preparation method thereof. The preparation method comprises the following steps: (1) formulating a supersaturated γ-cyclodextrin alkaline alcohol aqueous solution containing an alkali metal ion; (2) heating to obtain a hot γ-cyclodextrin solution; and (3) cooling the hot γ-cyclodextrin solution of the step (2), and performing crystallization and separation to obtain the cyclodextrin-based metal organic framework material. The CD-MOFs has perfect crystallization and large specific surface area, which are similar with those of a material prepared by means of traditional methods. The important thing is that the synthesis operation thereof is simple, green, and environmentally friendly, and the time required is shortened from a few hours or even tens of hours to a few minutes, which significantly
(Continued)

improves the synthesis efficiency and is conductive to industrial scale production.

9 Claims, 1 Drawing Sheet

(56) References Cited

FOREIGN PATENT DOCUMENTS

| | | |
|---|---|---|
| CN | 107837401 | 3/2018 |
| CN | 110054782 | 7/2019 |

OTHER PUBLICATIONS

Li, Haiyan et al., "Composite CD-MOF nanocrystals-containing microspheres for sustained drug delivery", The Royal Society of Chemistry,vol. 9 (Apr. 13, 2017) pp. 7454-7463.
Liu, Botao et al. "Microwave-Assisted Rapid Synthesis of γ-Cyclodextrin Metal-Organic Frameworks for Size Control and Efficient Drug Loading", Crystal Growth & Design, vol. 17 (Feb. 20, 2017), pp. 1654-1660.
Smaldone, Ronald A. et al., "Metal-Organic Frameworks from Edible Natural Products", Angew. Chem. Int. Ed., vol. 49(Aug. 16, 2010), pp. 8630-8634.

* cited by examiner

CYCLODEXTRIN-BASED METAL ORGANIC FRAMEWORK MATERIAL AND PREPARATION METHOD THEREFOR

CROSS-REFERENCE TO RELATED APPLICATIONS

This is the U.S. National Stage of International Patent Application No. PCT/CN2019/113455 filed on Oct. 25, 2019, which in turn claims the benefit of Chinese Patent Application No. 201910325089.1 filed on Apr. 22, 2019.

FIELD OF THE INVENTION

The present invention relates to a field of chemical industry production, in particular to a method for rapidly preparing cyclodextrin-based metal-organic framework material.

BACKGROUND OF THE INVENTION

Metal-organic frameworks (MOFs), also known as porous coordination polymers, are composed of metal ions or clusters and organic ligands via self-assembly under the coordination interaction. Because of their remarkable advantages, including high porosity, structural diversity, and function adjustability, various MOFs were prepared for versatile applications, such as gas storage, separation, catalysis, sensing, medicine release, etc. However, at present, the metal ions and the organic ligands of most MOFs all have some biotoxicity, comparatively harsh conditions for a synthetic reaction (e.g., high temperature, organic solvents, etc.), and long reaction time (ranging from a few hours to tens of hours), which limits the continuous and scale production of most MOFs. In addition, from the perspective of the biology or medicines application, the excellent biocompatibility, biodegradability characteristics required by the metal ions and organic ligands of the MOFs have greatly limited their broader application in the field of biological medicines. Therefore, it is one of hotspots of international research area to look for MOFs with mild synthesis conditions and good biocompatibility.

γ-cyclodextrin (γ-CD) is a kind of cyclic oligosaccharides with 8 glucopyranoses, which is produced through glucosyltransferases of the certain strains of *bacillus* acting on starch having been received widespread attention and application due to its superior biocompatibility, biodegradability and renewability. Since 2010, Professor Stoddart's team at Northwestern University used the ethanol volatilization method to prepare γ-cyclodextrin metal-organic frameworks (γ-CD-MOFs) and applied them in $CO_2$ adsorption, separation and detection of chiral molecules, and loading and delivery of biological medicines, which greatly broadened the applicable scope and high-value use of the γ-CD. In this method, a small open container filled with metal ions ($Li^+$, $K^+$, $Rb^+$, or $Cs^+$) and γ-CD. alkaline solution was placed in a large container containing methanol solution, and then sealed it; Afterwards the large container was placed in the 50 to 70° C. environment so that the methanol molecules can diffuse into the small container and mixed with the γ-CD. alkaline solution, which has driven the self-assembly between γ-CD and metal ions to obtain the cyclodextrin metal-organic frameworks (CD-MOFs).

The CD-MOFs crystal has shown potential application in biological because of their mild synthesis conditions and good biocompatibility with metal ions and organic ligands. However, the preparing process took a long time (dozens of hours), which is adverse to the scale production of the CD-MOFs. Since 2018, the professor Zhengyu Jin's team from Jiangnan University in China has invented a seed crystallization method for controlling the crystallization behavior of the CD-MOFs. They added starch-based nanoparticles (<100 nm) prior to the crystallization of the CD-MOFs with referring to the professor Stoddart's method, which has effectively shortened the synthesis time (approx. 6 h) and regulated the CD-MOFs particle size by controlling the amount of the starch-based nanoparticles. Up to now, it is worthwhile to note that the CD-MOFs synthesis still took several hours, thereby developing a method for rapidly preparing the CD-MOFs is a critical problem that urgently needs to be solved in the industrial scale production of the CD-MOFs.

SUMMARY OF THE INVENTION

Technical Problem

A technical problem to be solved in the present invention is how to rapidly prepare the CD-MOFs.

Solution to the Problem

Technical Solution

In view of the current long synthesis time of CD-MOFs, which limits their large-scale production in the industrial field, hence the purpose of the invention is to provide a method for rapidly preparing CD-MOFs. Green and quick preparation of the CD-MOFs were achieved by inducing the γ-CD dissolution and crystallization behavior in solution via simply heating and cooling the γ-CD supersaturated alkaline alcoholic solution, obtaining the biodegradable material with perfect crystallization and high specific surface area.

The invention purpose was achieved through the following scheme:

A preparation method for a CD-MOFs includes the following steps:

(1) formulating a supersaturated γ-CD alkaline alcohol aqueous solution containing an alkali metal ion;

(2) heating to obtain a hot γ-CD solution; and (3) cooling the hot γ-CD solution of the step (2), and performing crystallization and separation to obtain the CD-MOFs.

Preferably, the alkali metal ion is $K^+$, $Rb^+$, or $Cs^+$; and the alcohol is methanol or ethanol.

Preferably, the molar ratio of γ-CD to alkaline-earth metal ion in the supersaturated γ-CD alkaline alcohol aqueous solution is 1:6 to 1:12, the mass volume ratio of γ-CD to water was 0.1:10 to 0.6:10, and the volume ratio of the alcohol to the water was 2:5 to 5:5.

Preferably, the molar ratio of γ-CD to alkaline-earth metal ion in the supersaturated γ-CD alkaline alcohol aqueous solution is 1:7 to 1:10, the mass volume ratio of γ-CD to water is 0.2:5 to 0.3:5, and the volume ratio of alcohol to water is 3:5 to 5:5.

Preferably, the pH value of the supersaturated γ-CD alkaline alcohol aqueous solution is 10 to 14, preferably 12 to 14.

Preferably, the temperature of the hot γ-CD solution of the step (2) is 60 to 90° C., preferably 70 to 80° C.

Preferably, the hot γ-CD solution of the step (3) is cooled at a cooling rate of 5 to 20° C./min, preferably 7.5 to 15° C./min.

Preferably, the temperature of the hot γ-CD solution is reduced to 5 to 25° C., preferably 10 to 20° C.

Preferably, the separation of the step (3) is processed through centrifugation via a centrifugal machine or membrane filtration via a membrane with pore diameter less than 500 nm.

After the alcohol solution is separated from the CD-MOFs, the raw material alcohol is recycled by a distillation apparatus to reduce the raw material loss and environmental pollution.

Beneficial Effects of the Invention

Beneficial Effects

Relative to the Prior Art, the Present Invention has the Following Advantages and Beneficial Effects:

(1) In the present invention, the CD-MOFs is prepared by inducing dissolution and crystallization behaviors of the γ-CD in the alcohol solution via simply controlling heating and cooling processes, which is simple to operate, and green and environmentally friendly; and most importantly, synthesis time is shortened from a few hours or even tens of hours to a few minutes. The advantages of short operation time and high efficiency were conducive to the industrial production of CD-MOFs.

(2) The CD-MOFs rapidly sythesized by the preparation process of the present invention have the perfect crystalline structure and large specific surface area, and are similar to those prepared by traditional synthesis processes.

(3) The method disclosed in the present invention is not only restricted to the preparation of the CD-MOFs, but is also applicable to the rapid preparation of any MOFs by inducing changes in an aggregation structure, dissolution, and crystallization behavior of the organic ligands in an aqueous or organic phase through a heating-cooling process. This method will significantly improve the synthesis efficiency of the organic framework material.

DETAILED DESCRIPTION OF THE EMBODIMENTS

Hereinafter, the present invention will be further described in details with reference to the examples, but the embodiments are not limited thereto.

Materials used in the following examples can be commercially available.

Example 1

(1) 0.35 g (0.27 mmol) of γ-CD and 0.224 g (2.02 mmol) of potassium hydroxide are weighed and both dissolved in a methanol solution (a mixed solution with 8 mL of methanol and 10 mL of deionized water) to obtain a supersaturated γ-CD solution;

(2) the supersaturated γ-CD solution of the step (1) is heated to 90° C. to obtain a hot cyclodextrin solution; and (3) the hot solution of the step (2) is cooled down to 10° C. at 15° C./min, and the CD-MOFs are obtained via centrifugation at speed of 4000 r/min.

Figure 1:
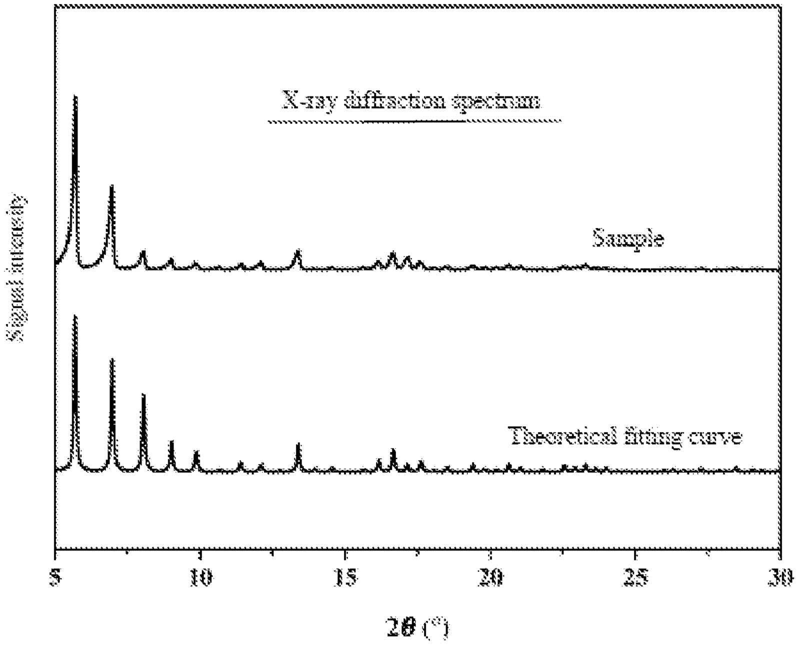
FIG. 1 is the x-ray diffraction spectrum of CD-MOFs prepared in Example 1.
Figure 2:
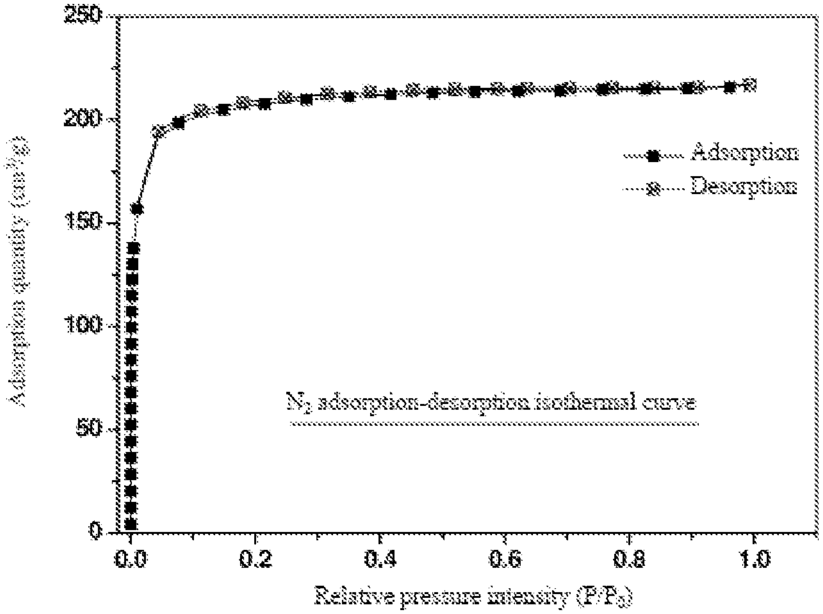
FIG. 2 is the $N_2$ adsorption-desorption isothermal curve of CD-MOFs prepared in Example 1.

The time of the CD-MOFs preparation is less than 9 min, which is significantly less than that of traditional method. As shown in FIG. 1, the prepared CD-MOFs presented a monocrystal diffraction pattern on the X-ray diffraction spectrum; and the specific surface area of CD-MOFs is 729.3 $m^2/g$ (FIG. 2), which is between 350 and 1400 $m^2/g$ of the material prepared by traditional methods.

Example 2

(1) 0.40 g (0.31 mmol) of γ-CD and 0.213 g (1.92 mmol) of potassium hydroxide are weighed and both dissolved in a methanol solution (a mixed solution with 4 mL of methanol and 8 mL of deionized water) to obtain a supersaturated γ-CD solution;

(2) the supersaturated γ-CD solution of the step (1) is heated to 60° C. to obtain a hot cyclodextrin solution; and (3) the hot solution of the step (2) is cooled down to 5° C. at 20° C./min, and the CD-MOFs are obtained via centrifugation at speed of 4000 r/min in a centrifuge.

The time of the CD-MOFs preparation is less than 6 min, which is significantly less than that of traditional method. The prepared CD-MOFs presented a monocrystal diffraction pattern on the X-ray diffraction spectrum; and the specific surface area of CD-MOFs is 568.2 $m^2/g$, which is between 350 and 1400 $m^2/g$ of the material prepared by traditional methods.

Example 3

(1) 0.35 g (0.27 mmol) of γ-CD and 0.15 g (2.68 mmol) of cesium hydroxide are weighed and both dissolved in an ethanol solution (a mixed solution with 6 mL of ethanol and 6 mL of deionized water) to obtain a supersaturated γ-CD solution;

(2) the supersaturated γ-CD solution of the step (1) is heated to 75° C. to obtain a hot cyclodextrin solution; and (3) the hot solution of the step (2) is cooled down to 5° C. at 10° C./min, and the CD-MOFs obtained by crystallizing is filtered through a filtration membrane with a pore diameter of 450 nm.

The time of the CD-MOFs preparation is less than 10 min, which is significantly less than that of traditional method. The prepared CD-MOFs present a monocrystal diffraction pattern on the X-ray diffraction spectrum; and the specific surface area of CD-MOFs is 860.9 $m^2/g$, which is between 350 and 1400 $m^2/g$ of the material prepared by traditional methods.

Example 4

(1) 0.40 g (0.31 mmol) of γ-CD and 0.26 g (2.11 mmol) of rubidium hydroxide are weighed and both dissolved in a methanol solution (a mixed solution with 6 mL of methanol and 8 mL of deionized water) to obtain a supersaturated γ-CD solution;

(2) the supersaturated γ-CD solution of the step (1) is heated to 70° C. to obtain a hot cyclodextrin solution; and (3) the hot solution of the step (2) is cooled down to 10° C. at 15° C./min, and CD-MOFs obtained by centrifugation at speed of 4000 r/min.

The time of the CD-MOFs preparation is less than 7 min, which is significantly less than that of traditional method. The prepared CD-MOFs present a monocrystal diffraction pattern on the X-ray diffraction spectrum; and the specific surface area of CD-MOFs is 1186.7 $m^2$/g, which is between 350 and 1400 $m^2$/g of the material prepared by traditional methods.

Example 5

(1) 0.40 g (0.31 mmol) of γ-CD and 0.27 g (2.64 mmol) of rubidium hydroxide are weighed and both dissolved in an ethanol solution (a mixed solution with 16 mL of ethanol and 40 mL of deionized water) to obtain a supersaturated γ-CD solution;

(2) the supersaturated γ-CD solution of the step (1) is heated to 60° C. to obtain a hot cyclodextrin solution; and (3) the hot solution of the step (2) is cooled down to 5° C. at 5° C./min, and the CD-MOFs obtained by centrifugation at speed of 4000 r/min.

The time of the CD-MOFs preparation is less than 14 min, which is significantly less than that of traditional method. The prepared CD-MOFs present a monocrystal diffraction pattern on the X-ray diffraction spectrum; and the specific surface area of CD-MOFs is 527.6 $m^2$/g, which is between 350 and 1400 $m^2$/g of the material prepared by traditional methods.

Example 6

(1) 0.40 g (0.31 mmol) of γ-CD and 0.378 g (3.70 mmol) of rubidium hydroxide are weighed and both dissolved in an ethanol solution (a mixed solution with 6 mL of ethanol and 7 mL of deionized water) to obtain a supersaturated γ-CD solution;

(2) the supersaturated γ-CD solution of the step (1) is heated to 90° C. to obtain a hot cyclodextrin solution; and (3) the hot solution of the step (2) is cooled down to 25° C. at 20° C./min, and the CD-MOFs obtained by centrifugation at speed of 4000 r/min The time of the CD-MOFs preparation is less than 7 min, which is significantly less than that of traditional method. The prepared CD-MOFs present a monocrystal diffraction pattern on the X-ray diffraction spectrum; and the specific surface area of CD-MOFs is 608.9 $m^2$/g, which is between 350 and 1400 $m^2$/g of the material prepared by traditional methods.

Example 7

(1) 0.40 g (0.31 mmol) of γ-CD and 0.246 g (2.22 mmol) of potassium hydroxide are weighed and both dissolved in a methanol solution (a mixed solution with 8 mL of methanol and 10 mL of deionized water) to obtain a supersaturated γ-CD solution;

(2) the supersaturated γ-CD solution of the step (1) is heated to 80° C. to obtain a hot cyclodextrin solution; and (3) the hot solution of the step (2) is cooled down to 20° C. at a cooling rate of 15° C./min, and the CD-MOFs obtained by crystallizing are filtered through a filtration membrane with a pore diameter of 450 nm.

The time of the CD-MOFs preparation is less than 7 min, which is significantly less than that of traditional method. The prepared CD-MOFs present a monocrystal diffraction pattern on the X-ray diffraction spectrum; and the specific surface area of CD-MOFs is 1075.8 $m^2$/g, which is between 350 and 1400 $m^2$/g of the material prepared by traditional methods.

Example 8

(1) 0.35 g (0.27 mmol) of γ-CD and 0.15 g (2.68 mmol) of cesium hydroxide are weighed and both dissolved in an ethanol solution (a mixed solution with 6 mL of ethanol and 6 mL of deionized water) to obtain a supersaturated γ-CD solution;

(2) the supersaturated γ-CD solution of the step (1) is heated to 80° C. to obtain a hot cyclodextrin solution; and (3) the hot solution of the step (2) is cooled down to 10° C. at 7.5° C./min, and the CD-MOFs obtained by crystallizing are filtered through a filtration membrane with a pore diameter of 400 nm.

The time of the CD-MOFs preparation is less than 13 min, which is significantly less than that of traditional method. The prepared CD-MOFs present a monocrystal diffraction pattern on the X-ray diffraction spectrum; and the specific surface area of CD-MOFs is 1018.6 $m^2$/g, which is between 350 and 1400 $m^2$/g of the material prepared by traditional methods.

The above examples are the preferred embodiments of the present invention, but not limited by the above-mentioned examples. Any other changes, modifications, substitutions, combinations, simplifications without departing from the spirit and principle of the present invention shall all be equivalent substitute modes, and fall within the scope of the present invention protection.

The invention claimed is:

1. A preparation method of CD-MOFs consisting of the following steps of:

(1) formulating supersaturated γ-CD alkaline alcohol aqueous solution containing an alkali metal ion;

(2) heating to obtain a hot γ-CD solution; and (3) cooling the hot γ-CD solution of the step (2), and performing crystallization and separation to obtain the CD-MOFs;

the molar ratio of γ-CD to the alkali metal ion in the supersaturated γ-CD alkaline alcohol aqueous solution is 1:6 to 1:12, the mass volume ratio of Y-CD to water is 0.1:10 to 0.6:10, and the volume ratio of alcohol to water is 2:5 to 5:5;

the temperature of the hot γ-CD solution of the step (2) is 60 to 90° C.;

the hot γ-CD solution of the step (3) is cooled at a temperature-decreasing rate of 5 to 20° C./min;

the temperature of the hot γ-CD solution is reduced to 5 to 25° C.

2. The method according to claim 1, characterized in that, the alkali metal ion is $K^+$, $Rb^+$, or $Cs^+$; and the alcohol is methanol or ethanol.

3. The method according to claim 1, characterized in that, the temperature of the hot γ-CD solution of the step (2) is 70 to 80° C.

4. The method according to claim 1, characterized in that, the molar ratio of the γ-CD to metal-salt ion in the supersaturated γ-CD alkaline alcohol aqueous solution is 1:7 to 1:10, the mass volume ratio of γ-CD to water is 0.2:5 to 0.3:5; and the volume ratio of the alcohol to water is 3:5 to 5:5.

5. The method according to claim 4, characterized in that, the pH value of the supersaturated γ-CD alkaline alcohol aqueous solution is 10 to 14.

6. The method according to claim 5, characterized in that, the pH value of the supersaturated γ-CD alkaline alcohol aqueous solution is 12 to 14.

7. The method according to claim 1, characterized in that, the hot γ-CD solution of the step (3) is cooled at a temperature-decreasing rate of 7.5 to 15° C./min.

8. The method according to claim 1, characterized in that, the temperature of the hot γ-CD solution is reduced to 10 to 20° C.

9. The method according to claim 1, characterized in that, the separation of the step (3) is processed through centrifugation via a centrifugal machine, or membrane filtration via a membrane with pore diameter less than 500 nm.

* * * * *